United States Patent Office 3,121,049
Patented Feb. 11, 1964

3,121,049
METHOD FOR COLLOIDALLY DISPERSING COLLAGEN
Tomio Nishihara, Tokyo, Japan, assignor to Nihon Hikaku, Kabushiki Kaisha, Tokyo, Japan, a corporation of Japan
No Drawing. Filed Aug. 24, 1961, Ser. No. 135,707
Claims priority, application Japan Sept. 19, 1960
3 Claims. (Cl. 195—6)

The present invention relates to the promotion of solubility of collagen fibers.

In the prior art, it has been known that collagen fibers in the natural state have strong resistance to the general proteolytic enzymes other than collagenase, for example, trypsin, pancreatine, chymotrypsin, pepsin, etc. When the collagen fibers are in a shrunken state due either to heating or to treatment with the so-called protein denaturing chemical agents, for example, bivalent salts such as calcium chloride, magnesium chloride, barium chloride, etc., or potassium thiocyanate or organic agents such as urea, sodium salicylate, guanidine hydrochloride, etc., they lose the above-mentioned resistance to the proteolytic enzymes and are capable of being dissolved by said enzymes. However, the collagen so dissolved has no fiber reproducing ability because it has already been decomposed into small peptides of low molecular weight.

The primary object of the present invention is to provide a novel method for the solution of collagen fibers in young or old animals, such as animal hides, tendons and bones, which are considered to be insoluble in dilute acid, alkali and salt solutions.

Another object of the present invention is to provide a novel method for the solution of collagen fibers, mentioned above, by preheating the collagens above their shrinkage temperatures, treating them with proteolytic enzymes and extracting with acids.

Yet another object of the present invention is to provide a method of processing the collagens mentioned into solutions having a fiber reproducing ability approximating a 100% yield.

Still another object of the present invention is to provide the method of processing the collagens, described above, with ease, quickly and efficiently, thus causing savings in time, labor and expense.

Yet another object of the present invention is to eliminate the disadvantages of the processings practiced in the prior art, mentioned above.

Other objects and advantages of my invention will become apparent to those skilled in the art, after a study of the following detailed description, in connection with the accompanying drawing.

The inventor discovered that denaturalization by heat has different effects from denaturalization by enzymes and it is his invention to combine the denaturalization by heat and enzymes to produce still other and sharply advantageous effects than experienced by either denaturalization alone.

With regard to denaturation due to heat: in the case of steer hide, the inventor discovered that denaturation occurs very sharply and rapidly at about 63° C.±1° C., but a higher temperature, for example, up to 75° C., does not affect the degree of shrinkage due to the denaturation. With regard to denaturation through digestion by an enzyme, however, the amount of collagen lost surprisingly depends upon the temperature which has caused the denaturation. The degree of shrinkage is the same. The loss of collagen when denatured at 63° C. and digested by trypsin for 90 hours at 25° C. is 10% when denatured at 75° C. and treated with an enzyme in the same way it amounts to about 50% in either case, if the residue left after digestion and removal by tryspin is shaken with the addition of 0.5% acetic acid, in 3–5 hours, all the collagen fibers are dispersed in the solution, which turns into a viscous colloidal solution. This turbid colloidal solution easily passes through a glass filter of pore size 20–30$\mu$, but passes through a glass filter of pore size 5–10$\mu$, with difficulty so that the average radius of gyration of a colloidal particle in the solution appears to be about 10–20$\mu$. This is far greater than that of the collagen molecule, and, accordingly, the colloidal particle appears to be an aggregate of about 30 molecules. When this colloidal solution is neutralized with sodium hydroxide, ammonia, etc. to pH 7–8, fibres are 100% reproduced. And, by the addition of a little amount of pepsin to the colloidal solution, this colloidal solution immediately becomes a clear monomolecularly dispersed solution. This can be proved by the flow birefringence and viscosity measurements. In the solution thus obtained, the collagen maintains its original rigid rod type helical structure. When this solution is neutralized with sodium hydroxide or ammonia to pH 7–8, fibers are 100% reproduced. Thus, even in the case of steer hide preheated to its denaturation temperature prior to enzyme treatment, the collagen fibers easily dissolve into a fiber reproducible solution by the enzyme treatment and acid extraction. Since the portions dissolved in the course of enzyme treatment are small peptides having no fiber reproducing ability, the yield thereof decreases unless it is pretreated at the lowest denaturation temperature.

According to a further aspect of the present invention the collagen fibers may be dissolved after denaturation at room temperature by the denaturating agents instead of by the process of heating, and then effecting enzyme treatment and acid extraction. In this case, too, same as in the case of pretreatment by heating, the collagen fibers remaining after treatment with trypsin are extracted with acetic acid. All the collagen fibers first turn into a fiber reproducible colloidal solution, and by the addition of pepsin, the clear monomolecularly dispersed solution can be obtained; however, the loss of collagen in the course of digestion by an enzyme, depends, in the case of denaturation due to denaturating agents, surprisingly upon their concentration. Therefore, it is necessary to select the lowest concentration capable of causing denaturation. Now, an explanation is herein below given of this invention by mentioning working examples. This is a discovery of a phenomenon parallel to that mentioned before, as to the loss of collagen depending upon the temperature by heat denaturation.

*Example 1*

One sheet of steer hide taken immediately after slaughtering having the weight of about 30 kg. (hair 3.5 kg., moisture content 12 kg.), is cut into a sheet of 10 cm$^2$, which is then washed in 150 $l$. of 5% salt solution for 6 hours repeatedly four times, and after fully removing soluble proteins such as albumin, globulin, etc., it is washed in running water for 5 hours. The washed steer hide is immersed in 150 $l$. of hot water preheated to 60° C. As the temperature is lowered by the immersion of hide, steam is applied to raise the temperature gradually at a rate of 1° C. in 2 minutes to 63° C. with violent agitation. Then the temperature is kept at 63° C. for 20 minutes. The hide thus treated with heat is cooled down to 25° C. and immersed in 50 $l$. of boric acid buffer solution of pH 8, followed by the addition of 300 g. of trypsin and 100 g. of sodium silicofluoride as antibiotics, and, the hide is kept thus for 48 hours at 25° C. with occasional agitation. During that time, 5% of the dry weight, i.e. 700 g., of the collagen fibers of steer hide is dissolved as small peptide of low molecular weight which cannot reconstitute the collagen fiber. The undissolved portion remains unchanged in its appearance.

Through this treatment with enzyme, the hair becomes easily removable from the hide by just light rubbing. After removing the hair, the hide is washed three times in 100 l. of 5% salt solution and is thereafter further washed for 10 hours in running water. When the hide after having been thus subjected to temperature treatment, enzyme treatment, thereafter to removal of hair and to washing, is immersed in 120 l. of 0.5% acetic acid solution and agitated vigorously for 6 hours, all the collagen fibers are easily dispersed into a colloidal solution. At this time, the total amount of solution is about 150 l. and its collagen concentration is 0.8%. After this colloidal solution is separated centrifugally or filtrated by a filter press using cloth or pulp as a filter-aid and thereafter neutralized with ammonia to make pH 6–8, there occurs a complete reconstitution of fibers. The fibers thus reproduced are collected by means of centrifugal separation, washed with water and thereafter dried with acetone to obtain 12 kg. of pure white dry fibers.

The turbid colloidal solution of collagen obtained by the above-mentioned process may be changed into a clear monomolecularly dispersed solution by digesting the 150 l. of colloidal solution with 30 g. of pepsin at 25° C. for 24 hrs. This solution is then clarified centrifugally or filtrated and thereafter neutralized with ammonia to pH 6–8 to reconstitute fibers completely. The fibers thus reconstituted are then collected by centrifugal separation, washed with water and dried with aceton to obtain 12 kg. of pure white collagen fibers. The difference between the reconstitution of fibers directly from the turbid colloidal solution in which the molecules are dispersed in an aggregate form and that of fibers from the clear monomolecularly dispersed solution is that the former is hardly soluble in hot water (60°–70° C.), whereas the latter is easily soluble, so that the latter fibers are suitable for the manufacture of gelatin. While, in this example, the steer hide immediately after slaughtering is used as raw material, the same result can be obtained with cured hide, the limed unhaired hide and with osein prepared from animal bone. However, in treatment of limed hide, even after the neutralization of calcium hydroxide, the shrinkage temperature lowers to 55° C., so that unless the lowest shrinkage temperature is measured in advance according to the kind and state of raw material and the pretreatment is effected at that temperature, the loss of collagen fibers at the stage of enzyme treatment becomes large. While in this example, trypsin was used for enzyme treatment, the same result can be obtained by using any other proteolytic enzymes, other than collagenase, having the enzyme activity at pH 5–9, that is pancreating and, chymotrypsin. The same results are obtained if the clear monomolecularly dispersed solution from the turbid colloidal solution, is treated with a proteolytic enzyme other than pepsin having the activity at pH 4.5–1, for example, the enzymes extracted from fungi. When any acids are used for extraction, other than acetic acid, for example, inorganic acid such as hydrochloric acid, sulfuric acid, etc., or organic acid such as citric acid, malonic acid, lactic acid, etc., at pH 4.5–1.5, the same results are accomplished.

*Example 2*

This example refers to the use of protein denaturating agents at room temperature as pretreatment. In the same way as described in Example 1, 30 kg. of steer hide washed with a salt solution and running water is immersed in a 2.5 M potassium thiocyanate solution or a 3 M calcium chloride solution for 24 hours at 25° C. and thereafter washed in running water for 24 hours to remove the denaturing agents. Again, in quite the same way as described in Example 1, the enzyme treatment, washing and acid extraction are effected to obtain a turbid colloidal solution, followed by the neutralization, washing and drying to obtain 12 kg. of pure white reconstituted fibers. Also, in the same way as described in Example 1, the turbid colloidal solution is made into a completely clear monomolecularly dispersed solution by using pepsin, followed by the neutralization, washing and drying to obtain 12 kg. of reconstituted fibers. As the denaturing agents, bivalent inorganic salts such as barium chloride, magnesium chloride, etc. other than potassium thiocyanate and calcium chloride, sodium salicylate, guanidine hydrochloride, urea, etc. can be used to obtain the same result, but if the lowest concentration for the denaturation is not selected in respect of each thereof, the loss at the stage of enzyme treatment becomes large.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as claimed.

What is claimed is:

1. A process for dispersing colloidally collagen fiber materials, which are normally insoluble in dilute acid, alkali and neutral salt solutions, into a fiber reproducible state, comprising the steps of; firstly, de-naturing the collagenous material by preheating it for 20 minutes to 63° C.; secondly, re-naturing the product of the first step by cooling it to 25° C. and immersing it in an acid buffer solution of pH 8; thirdly, treating the product of the second step with a proteolytic enzyme selected from a class consisting of trypsin, chymotrypsin, and pancreatin, for 48 hours, and fourthly, dispersing the product of the third step into 0.5% acetic acid solution for six hours for extraction.

2. A process for dispersing colloidally collagen fiber materials, which are normally insoluble in dilute acid, alkali and neutral salt solutions, into a fiber reproducible state, comprising the steps of: firstly, pre-de-naturing the collagenous material with a protein de-naturing agent selected from the group consisting of potassium thiocyanate and calcium chloride at 25° C. for 24 hours; secondly, re-naturing the product of step one by washing it in water until the de-naturing agents are removed; thirdly, treating the product of step two with a proteolytic enzyme selected from a class consisting of trypsin, chymotrypsin, and pancreatin for 48 hours; and fourthly dispersing the product of step three into 0.5% acetic acid solution for six hours for extraction.

3. A process for preparing a molecularly dispersed fiber reproducible collagen solution normally insoluble in dilute acid, alkali and neutral salt solutions, comprising the steps of: firstly, preheating the collagen to 63° C. for 20 minutes in water until shrinkage occurs; secondly, cooling the product of step one to 25° C. and immersing it in acid buffer solution of pH 8; thirdly, treating the product of step two with a proteolytic enzyme selected from a class consisting of trypsin, chymotrypsin, and pancreatin for 48 hours; fourthly, dispersing the product of step three into 0.5% acetic acid solution for six hours for extraction, and fifthly, treating the collioidally dispersed solution thus obtained with pepsin at 25° C. for 24 hours.

References Cited in the file of this patent

Gustavson: The Chemistry and Reactivity of Collagen, Academic Press Inc., New York (1956), pp. 260 to 270.